United States Patent [19]
Tanigawa et al.

[11] 3,864,439
[45] Feb. 4, 1975

[54] GAS-LIQUID CONTACTING APPARATUS

[75] Inventors: Shogo Tanigawa; Takesi Yokoyama, both of Tamanoshi, Japan

[73] Assignee: Mitsui Shipbuilding and Engineering Co., Ltd, Tokyo, Japan

[22] Filed: Dec. 12, 1972

[21] Appl. No.: 314,380

[30] Foreign Application Priority Data
Dec. 29, 1971 Japan.................................. 47-2666
Dec. 21, 1971 Japan................................ 46-21439
Dec. 21, 1971 Japan................................ 46-21440

[52] U.S. Cl. .............................. 261/114 R, 55/455
[51] Int. Cl............................................. B01f 3/04
[58] Field of Search............ 261/114 R; 55/257, 455

[56] References Cited
UNITED STATES PATENTS

| | | |
|---|---|---|
| 2,560,077 | 7/1951 | Bloomer et al. ................. 261/114 R |
| 2,965,548 | 12/1960 | Hachmuth...................... 261/114 R |
| 3,125,614 | 3/1964 | Mayfield et al................. 261/114 R |
| 3,362,696 | 1/1968 | Vaughan.......................... 261/114 R |
| 3,417,975 | 12/1968 | Williams et al................. 261/114 R |
| 3,779,527 | 12/1973 | Tanigawa et al................ 261/114 R |
| 3,779,528 | 12/1973 | Tanigawa et al................ 261/114 R |

*Primary Examiner*—Tim R. Miles
*Attorney, Agent, or Firm*—Howson & Howson

[57] ABSTRACT

A gas-liquid contacting apparatus provided with vertically spaced trays having gas flow apertures therein and gas-liquid contacting devices provided on the trays. Each contacting device has a cover for preventing gas and liquid from ascending, a vertical wall having a plurality of gas-liquid apertures, and a plate for downwardly and tangentially deflecting the gas and liquid flow out of the gas-liquid apertures.

1 Claim, 5 Drawing Figures

GAS-LIQUID CONTACTING APPARATUS

The present invention relates to a gas-liquid contacting apparatus for heat or mass transfer, such as distillation apparatus or absorption apparatus in the chemical industry.

An object of the present invention is to provide a gas-liquid contacting apparatus in which separation of gas and liquid after contacting is effectively performed to prevent the entrainment of liquid.

A further object of the present invention is to provide a gas-liquid contacting apparatus which is relatively simple in construction and may be manufactured easily.

To this end, a gas-liquid contacting apparatus in accordance with the present invention is provided with vertically spaced trays having gas flow apertures therein and with a gas-liquid contacting device provided over each gas flow aperture in each tray. Each of the gas liquid contacting devices has a vertical wall with an upper portion having a plurality of apertures through which a gas-liquid mixture flows from the interior of the device. A deflecting plate is located adjacent each aperture and is arranged in such a manner as to cause the gas-liquid medium to be deflected downwardly and tangentially relative to the wall.

Figure 1:
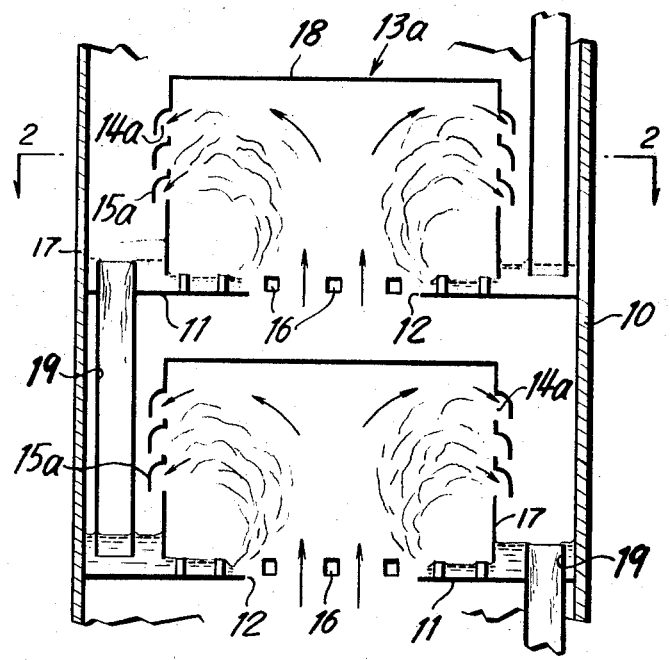
FIG. 1 is a vertical sectional view of one embodiment of the present invention.
Figure 2:
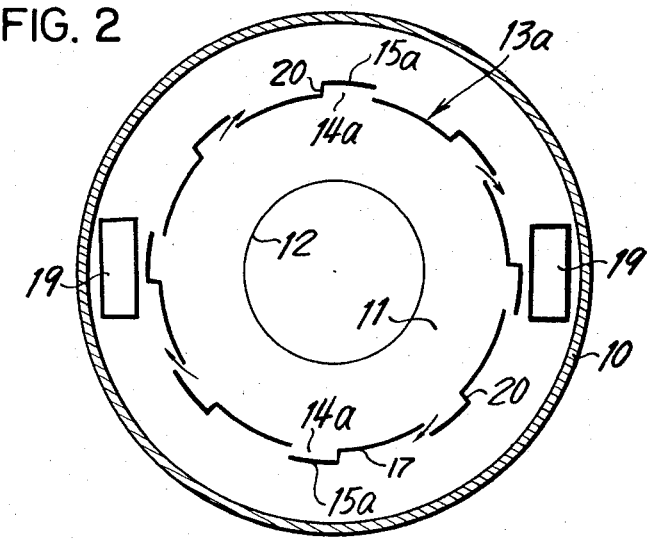
FIG. 2 is a sectional view taken on line 2—2 in FIG. 1.
Figure 3:
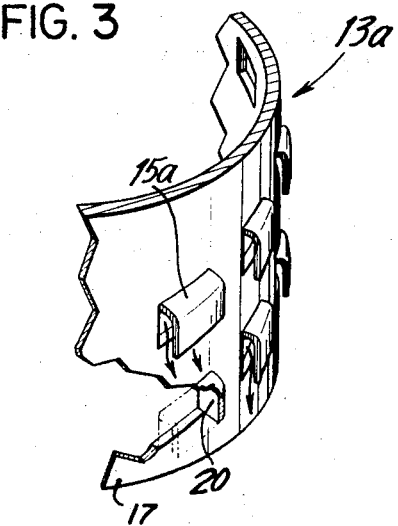
FIG. 3 is a perspective view of a portion of a gas-liquid contacting device.

Referring now to the drawings, there is illustrated in FIGS. 1 and 2 gas-liquid contacting apparatus embodying the present invention. The apparatus comprises a column 10 in which is mounted at spaced intervals a plurality of trays 11 each having a gas-flow aperture 12 therein. A gas-liquid contacting device 13a is associated with each aperture 12 and comprises an upstanding vertical cylindrical wall 17 which is closed at its upper end by a cover 18. The lower edge of the wall 17 defines a weir for the liquid on the tray 11, and a plurality of ports 16 are provided around the periphery of the lower portion of the wall 17. A plurality of gas-liquid apertures 14a are provided in the wall 17, and as best seen in FIG. 3, the apertures are inclined with respect to the level of the tray 11. A deflecting plate 15a is located adjacent each aperture and is arranged with respect thereto so as to direct downwardly and tangentially relative to the wall 17 the gas-liquid medium flowing outwardly through the aperture 14a. In the embodiment illustrated in FIG. 3, an end plate 20 is provided at the upper end 20 of the aperture 14a. Each tray 11 is also provided with a downcomer 19 at the outside of the gas-liquid contacting device 13, the downcomer projecting upwardly from the tray 11 to maintain liquid thereon at a predetermined depth, and the lower end thereof being near the lower tray. The of the downcomer being near the lower tray. The downcomers alternate at diametrically-opposite locations with respect to the trays 11 inside the column 10.

Liquid on the tray 11 overflows into the top of the downcomer 19 and flows down the inside wall thereof. The liquid is maintained on each tray 11 at a level determined by the height of the downcomer, and the liquid is flowed through the ports 16 in the wall 17 to the aperture 12 of the tray 11. The liquid on the tray is blown up by the gas ascending through the aperture 12 to form a gas liquid mixing flow in the contacting device 13a. The gas-liquid mixing flow ascends in the contacting device and is turned by the cover 18, and the flow passes through apertures 14a of the wall. Gas is separated from the liquid as it passes through the apertures, and ascends to the upper tray. Atomized liquid is collected when it passes through the apertures and forms into drops or flows, and flows down to the pool maintained on the tray 11. It should be noted that the deflecting plates act to guide the liquid, in the downward and tangential direction, so that separation of liquid and gas is effectively achieved.

Figure 4:
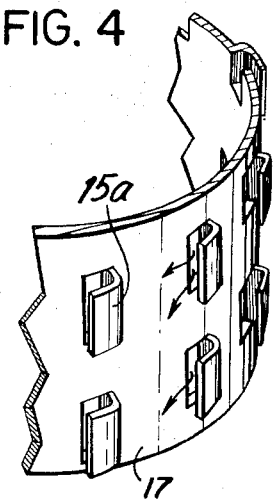
FIG. 4 is a perspective view showing a part of another embodiment of the present invention.
Figure 5:
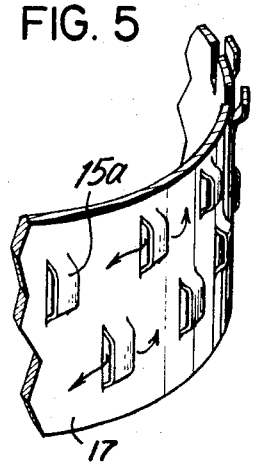
FIG. 5 is a perspective view showing a part of further embodiment of the present invention.

Deflecting plates 15a in apparatus shown in FIGS. 4 and 5 are also effective to separate the liquid from gas. These deflecting plates are made by punching out of the wall plate of the device.

From the foregoing, it will be understood that the present invention provides a novel gas-liquid contacting apparatus in which separation of gas and liquid is effectively performed and gas-liquid contacting efficiency is increased.

We claim:

1. Gas-liquid contacting apparatus comprising a column having trays provided at spaced intervals, each tray being provided with a weir means for maintaining a depth of liquid thereon, a downcomer communicating with the weir means, openings communicating with the space below the tray, gas-liquid contacting devices surrounding said openings each having a cover to prevent gas and liquid from ascending and a wall having a plurality of rectangularly-shaped inclined gas-liquid apertures, and a deflecting plate located adjacent each aperture at the outside of the wall to deflect downwardly and tangentially a gas-liquid mixture flowing outwardly through the apertures.

* * * * *